United States Patent [19]

Morris

[11] Patent Number: 4,476,757
[45] Date of Patent: Oct. 16, 1984

[54] ADJUSTABLE FEATHERBOARD

[75] Inventor: David S. Morris, Columbia, Mo.

[73] Assignee: Shopsmith, Inc., Dayton, Ohio

[21] Appl. No.: 414,134

[22] Filed: Sep. 2, 1982

[51] Int. Cl.³ .............................................. B26D 7/06
[52] U.S. Cl. ........................................ 83/446; 83/420; 83/449; 144/253 F
[58] Field of Search ...................... 83/477.2, 437, 441, 83/442, 446–449, 698, 700, 420–421, 732; 144/253 F; 403/153, 248, 290, 381; 411/401

[56] References Cited

U.S. PATENT DOCUMENTS

| | | | |
|---|---|---|---|
| 816,424 | 3/1906 | Bemis | 83/438 |
| 1,282,538 | 10/1918 | Cadwallader | 411/401 |
| 2,525,894 | 10/1950 | Graham | 144/253 F |
| 2,705,034 | 3/1955 | Gaskell | 144/253 F |
| 2,722,247 | 11/1955 | Schroeder | 83/446 |
| 3,186,452 | 6/1965 | Magnussen | 83/745 |
| 3,927,706 | 12/1975 | Davey | 144/253 F |
| 4,128,118 | 12/1978 | Ede | 144/134 D |
| 4,132,256 | 1/1979 | Jones | 83/446 |

OTHER PUBLICATIONS

R. J. DeCristoforo, "Power Tool Woodworking for Everyone", published by Shopsmith, Inc., Vandalia, Ohio, pp. 42-43.

Primary Examiner—James M. Meister
Assistant Examiner—J. L. Knoble
Attorney, Agent, or Firm—Biebel, French & Nauman

[57] ABSTRACT

An adjustable featherboard is used with a table saw or other tool of the type having a substantially flat saw table having at least one groove formed in its surface and a blade slot adjacent and parallel to the groove, and consists of a body having a plurality of angularly extending elongated fingers and a pair of transverse and substantially parallel slots therethrough; a pair of mounting bolts, each positioned in a different one of the slots and having a threaded shank, a flared lower end, and a knob threaded on an upper end of the shank; and an expansion bar extending beneath the slots and sized to engage slidably the groove in the saw table and having a pair of bores therethrough which receive the flared ends of the mounting bolts. Rotation of the knob in a first direction clamps the body between the knob and the bar and draws the flared ends upwardly in the bores so that the bar expands transversely within the groove to secure the featherboard to the groove; reverse rotation of the knob permits the expansion bar to contract to its unexpanded width, thereby permitting removal of the featherboard from the saw table.

20 Claims, 6 Drawing Figures

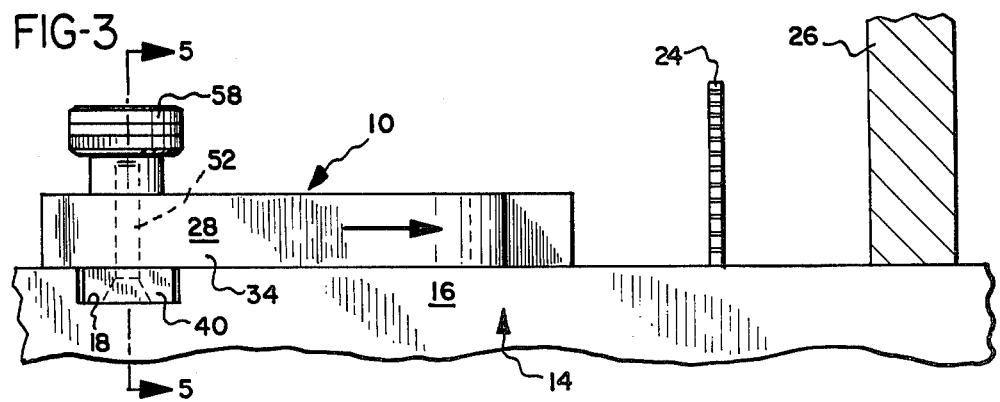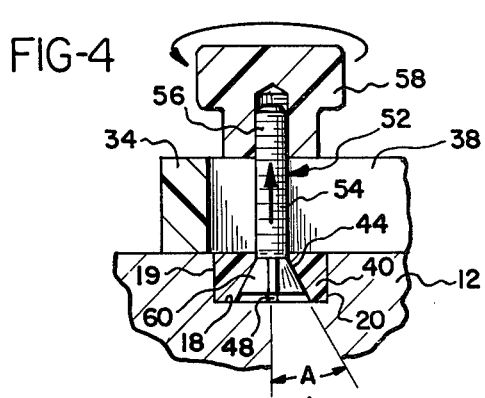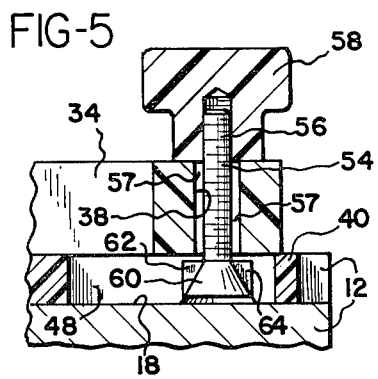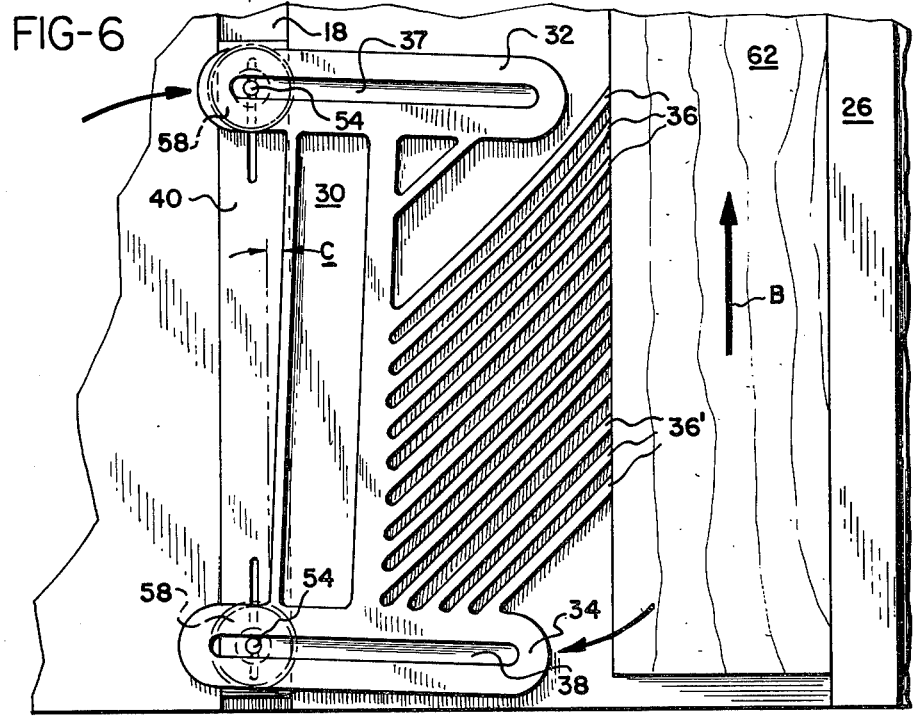

ADJUSTABLE FEATHERBOARD

BACKGROUND OF THE INVENTION

1. Field of the Invention

The present invention relates to table saw accessories and, more particularly, to accessories which may be mounted directly to the saw table to guide stock across the saw blade.

2. Prior Art

A table saw typically consists of a motor-driven circular saw blade centrally mounted beneath a horizontal, substantially flat saw table having a blade slot through which the saw blade protrudes. A groove is formed in the surface of the saw table on either side of the saw blade opening, oriented parallel to the saw blade and blade slot and extending the length of the saw table. The grooves are sized to receive table saw accessories such as a miter gauge, which is used for cross cutting and mitering operations.

The table saw also includes an accessory known as a rip fence. A rip fence is an elongated bar which is oriented parallel to the saw blade and is adjustably attached to the saw table by means such as clamps which engage opposing edges of the saw table. A rip fence is used for ripping and dadoing or as a guide, stop, support or jig for other operations.

To perform a ripping operation, which is the sawing of a length of stock, usually in a longitudinal direction with the grain of the wood, a featherboard is often used in combination with the rip fence. A featherboard typically is made of wood and consists of a body having an elongate shape and a plurality of thin, flexible fingers extending outwardly from the body.

The featherboard is positioned on the saw table adjacent the saw blade and opposite the rip fence, and is secured to the saw table by C-clamps or other types of clamping devices.

To use such a featherboard, it is first positioned on the saw table such that its fingers extend toward the saw blade and terminate a distance from the rip fence slightly less than the width of the stock to be cut. The featherboard is then clamped to the table by C-clamps and the saw motor activated. As the stock is pushed toward the blade of the saw by the operator, the stock passes between the featherboard and the rip fence, bending the fingers of the featherboard slightly.

The inherent resiliency of the fingers push the stock toward the rip fence, thereby holding the stock against the rip fence and preventing it from drifting away from the fence during the cutting operation. By holding the stock firmly against the rip fence as the stock passes across the saw blade, a straight cut will be achieved, and the danger of the stock becoming skewed relative to the saw blade is greatly reduced.

A disadvantage with featherboards of that type is that, once clamped to the saw table, the featherboards cannot be adjusted or displaced. A second disadvantage is that the need for utilizing C-clamps to hold the featherboard in place on the saw table increases the total expense of the featherboard and limits the applicability of the featherboard to saw tables shaped and sized such that the C-clamps are capable of reaching and clamping a featherboard positioned adjacent a blade slot which is centrally located in the saw table.

Accordingly, there is a need for a featherboard which mounts easily and quickly to the surface of a saw table and which does not require C-clamps or additional mounting devices which add to the overall expense of the featherboard. Furthermore, there is a need for a featherboard which does not require a clamping device which must extend over the ends of the saw table.

SUMMARY OF THE INVENTION

The present invention is directed to a featherboard for use with a saw table which can be quickly and easily mounted to the surface of the saw table without requiring the use of C-clamps or other clamping devices that must extend over the ends of the table. The featherboard may also be used for dadoing, molding, shaping and routing.

The featherboard of the present invention is particularly adapted to be used in combination with a table saw of the type which includes a substantially flat saw table having at least one groove formed in its surface and a circular blade slot adjacent and parallel to the groove. Because the featherboard utilizes one of the longitudinal grooves formed in the surface of the saw table for mounting to the saw table, it does not require additional holes to be tapped into the saw table or the mounting of additional brackets.

The featherboard consists of a body having a plurality of fingers extending angularly with respect to the plane of the saw blade. The ends of the fingers are shaped such that the likelihood of kickback is reduced. A pair of parallel slots are formed in the featherboard extending normally to the plane of the saw blade, an expansion bar adapted to fit snugly within a groove formed in the table surface, and a pair of mounting bolts extending upwardly through tapered bores formed in the expansion bar and through the slots in the body of the featherboard.

The mounting bolts each include a threaded shank, a flared lower end received within a similarly-shaped expansion bar bores, and a knob threaded onto an upper end of the shank which protrudes above the body.

To mount the featherboard to the surface of a saw table, the expansion bar is positioned within a groove on the saw table and the knobs rotated, causing the flared lower ends of the bolts to move upwardly. Since the flared lower ends of the bolts are in engagement with the walls of the tapered bores of the expansion bar, upward movement of the flared lower ends of the bolts causes the expansion bar to be expanded in a transverse dimension adjacent the mounting bolts, thus exerting pressure upon the side walls of the groove in the saw table. Once the expansion bar has been expanded transversely sufficiently, the expansion bar cannot move within the groove and the featherboard is locked to the top of the saw table.

The expansion bar is made from a material having some resiliency, so that when the knobs are loosened, the bar resumes its original unexpanded shape, and can be lifted out of the groove so that the featherboard may be removed from the saw table or displaced along the groove. A metal expansion bar could be used in this regard, and its resiliency enhanced through the use of cuts formed through the tapered boxes.

The featherboard of the present invention may be adjusted laterally so that the fingers can be spaced from a rip fence a predetermined distance by placing the expansion bar within a saw table groove, then displacing the body toward or away from the rip fence so that the mounting bolts slide along the transverse slots in the body. Once the featherboard is positioned as desired, the knobs are tightened to both expand the expansion bar within the saw table groove and lock the featherboard with respect to the expansion bar, thereby securing the featherboard to the saw table in the desired lateral position. Thus, stock having a variety of widths can be accommodated.

Often, it is desirable to skew the featherboard relative to the saw blade and rip fence (which typically are parallel to each other during a ripping operation) so that the stock is urged against the vertical guide surface of the rip fence with increasing pressure as it passes between the featherboard and the fence and is cut by the saw blade. To accomplish this with the present invention, the transverse slots formed in the body are dimensioned to have a width greater than the outside dimension of the threaded shanks of the bolts to provide clearance between the bolts and the slots, thereby permitting the body to be skewed relative to the expansion bar.

Accordingly, it is an object of the present invention to provide a featherboard which may be mounted to the surface of a saw table without C-clamps or other means extending over the ends of the saw table; which does not require the mounting of brackets or the tapping of holes in the surface of the saw table to effect mounting thereto; which may be mounted and removed relatively easily; and which may be skewed relative to the saw blade and/or rip fence.

Other objects and advantages of the invention will be apparent from the following description, the accompanying drawings and the appended claims.

BRIEF DESCRIPTION OF THE DRAWINGS

FIG. 3 is an end elevation of the featherboard of FIG. 1 shown before mounting to a saw table;

FIG. 4 is a detail showing a mounting bolt joining the body to the expansion bar taken at line 4—4 of FIG. 2;

FIG. 5 is a detail showing a mounting bolt joining the body to the expansion bar, taken at line 5—5 of FIG. 3; and FIG. 6 is a plan view of the featherboard of FIG. 1, showing the body skewed relative to the expansion bar.

DESCRIPTION OF THE PREFERRED EMBODIMENT

Figure 1:
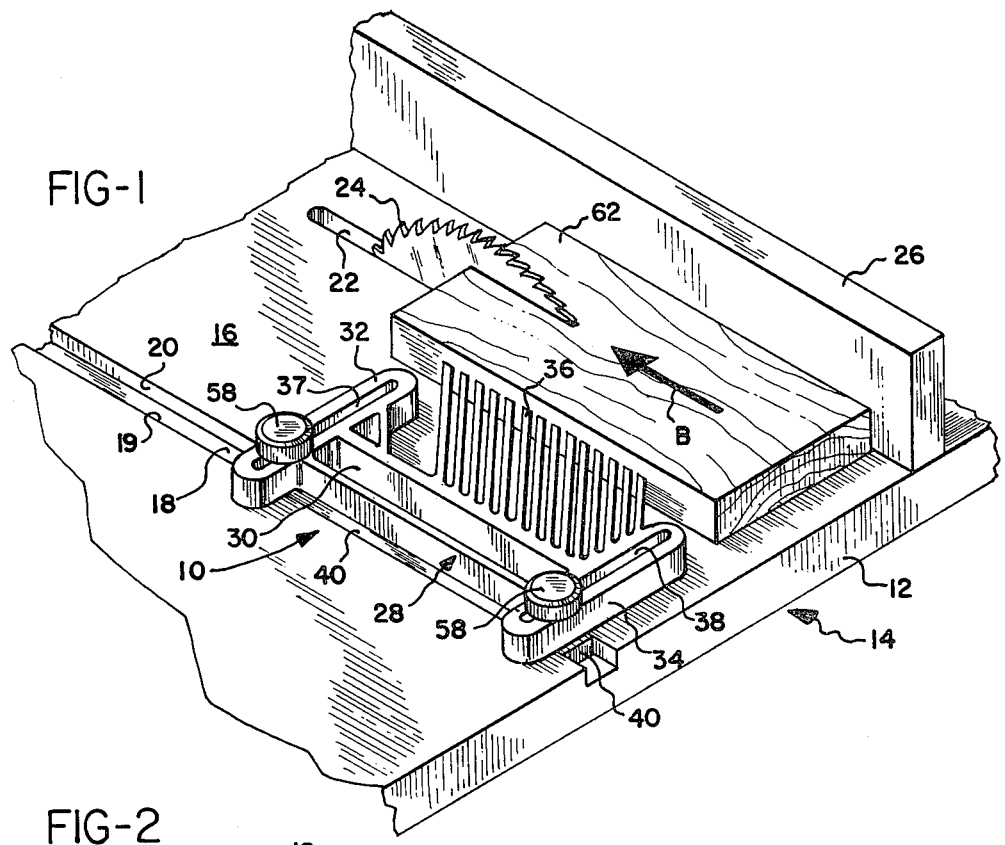
FIG. 1 is a perspective view of a preferred embodiment of the featherboard of the present invention, shown mounted on a saw table adjacent a piece of wood stock.
Figure 2:
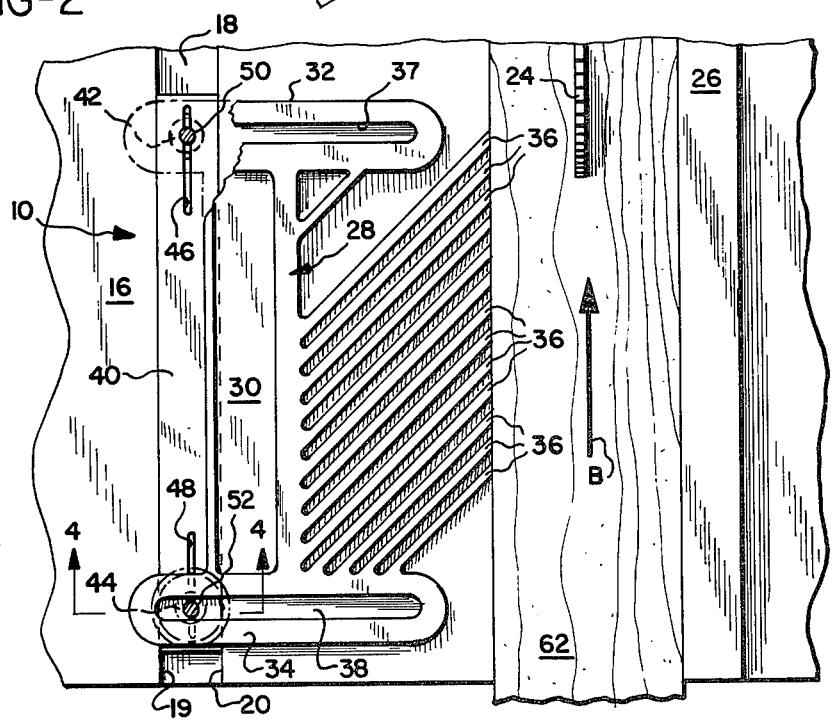
FIG. 2 is a plan view of the featherboard and saw table of FIG. 1.

As shown in FIGS. 1 and 2, the featherboard of the present invention, generally designated 10, is adapted to be mounted to a saw table 12 of a table saw 14. The saw table 12 is of the type having a substantially flat, horizontal surface 16, in which a groove 18 is formed, having side walls 19,20, and which extends longitudinally across the table and parallel to a blade slot 22 through which protrudes a circular saw blade 24. The table saw 14 preferably also includes a rip fence 26 of well-known design which is secured to the saw table 14 by well-known means such as clamps (not shown).

The featherboard 10 includes a body 28 having a longitudinal portion 30 and transverse portions 32,34, located at the ends of the longitudinal portion and having transverse slots 37 and 38, respectively. The body 28 also includes a plurality of angularly extending, flexible fingers 36, protruding from the longitudinal portion 30 and transverse portion 34. The fingers 36 preferably make an angle with the longitudinal portion of less than 90°

The featherboard 10 also includes an expansion bar 40 which is positioned beneath the body 28 and is sized to engage slidably the groove 18 on the saw table 12. The expansion bar 40 is sufficiently long to pass beneath the transverse portions 32,34 and defines frusto-conical bores 42,44 beneath the slots 37,38, respectively (also shown in FIG. 4). The expansion bar also includes a pair of longitudinally extending slits 46,48 which intersect the bores 42,44.

The expansion bar 40 is attached to the body 28 by means such as mounting bolts 50,52. As shown in FIGS. 4 and 5 for mounting bolt 52, each of the mounting bolts 50,52 includes a threaded shank 54 that extends through the slots 37,38 and has an end 56 that protrudes upwardly from the upper surface of the transverse portions 32,34 of the body 28. The diameter of the shank 54 is less than the width of the slot 38, thereby creating a gap 57 about the shank. A knob 58, or other tightening means such as a wing nut, is threaded onto the upper end 56 and includes a threaded recess 59 of sufficient length that the upper end can be drawn up into it.

The lower portion of the shank 54 terminates in a flared end 60 which is shaped to fit within the frusto-conical bore 44 formed in the expansion bar 40. The flared end 60 preferably has a slope which makes an angle A of at least 30° with the vertical, and preferably is less than 45°. A flared end having a slope less than 30° from the vertical would tend to bind within the expansion bar when the shank is tightened by rotation of the knob 58, and would not slip downwardly against the bore 44 when the shank 54 is loosened. Conversely, slopes greater than 45° would result in a shank that requires excessive force to expand properly the expansion bar upon rotation of the knob 58.

As shown in FIGS. 4 and 5, the flared end 60 includes a pair of ears 62,64 which extend from opposite sides of the flared end 60 and are sized to fit within the slit 48 formed in the expansion bar 40 adjacent the bore 44. The engagement of the ears 62,64 with the slit 48 prevents rotation of the shank 54 as the knob 58 is rotated.

While it will be understood that the featherboard 10 of the present invention may be used in combination with any means which provides a guide surface during different types of cutting, such as dadoing, without departing from the scope of the invention, for purposes of illustration, the following discussion is directed to use of the invention for a ripping operation.

In a ripping operation, the table saw 14 is set up with rip fence 26 positioned a predetermined distance from the saw blade 24 so that the ripping operation produces pieces having the desired width. The featherboard 10 is then positioned on the saw table 16 with the expansion bar 40 located within the groove 18 (shown in FIG. 3).

The body 28 is then displaced laterally with respect to the expansion bar 40, with the mounting bolts 50,52 riding within the slots 37,38 until the outboard ends of the fingers 36 are the desired distance from the rip fence 26. This distance preferably is slightly less than the width of the stock 62 to be ripped (FIG. 3).

Once the body has been positioned, the knobs 58 are rotated to cause the shanks 56 of the mounting bolts 50,52 to be drawn upwardly through the body 28. The upward movement of the shanks 54 causes the flared ends 60 to be displaced with respect to the bores 42,44, and the inclined surfaces of the flared ends force the longitudinal sides of the expansion bar 40 outwardly in the vicinity of the bores 44. This outward movement is constrained by the side walls 19,20 of the groove 18, thereby securing the expansion bar 40 firmly within the groove. Thus, tightening the shanks 54 serves a dual purpose of securing the expansion bar 40 in the groove 18 and clamping the body 30 to the expansion bar to prevent relative movement therebetween. The ripping operation may now begin.

The table saw 14 is activated, causing the blade 24 to rotate in a clockwise direction, as shown in FIG. 1. The stock 62 is advanced in the direction of arrow B between the rip fence 26 and the ends of the fingers 36 of the featherboard 10. The fingers 36, which are angled toward the direction of travel of stock 62, are bent inwardly toward the longitudinal portion 30 by the stock. This deflection causes the resilient fingers to exert an equal and opposite force against the stock 62, urging it against the rip fence 26. Thus, the stock 62 is held firmly in place as it is ripped by the saw blade 24.

An alternate method of operation is shown in FIG. 6. In this method, the featherboard 10 is positioned on the table, as previously described, with the expansion bar 40 placed within the groove 18. However, the body 30 is skewed with respect to the expansion bar 40 and groove 18 an amount represented by angle C, which is on the order of a few degrees. This skewing is achieved by rotating the body 30 so that the fingers 36 adjacent the downstream transverse portion 32 are closer to the rip fence 26 than are the fingers 36' adjacent the upstream transverse portion 34.

This skewing is made possible by the threaded shanks 54 which, as mentioned previously, have a diameter which is less than the width of the slots 37,38 formed in the transverse portions 32,34, respectively. Thus, the body 30 may be rotated until the shanks 56 close the gaps 57 (FIG. 5) and abut the side walls of the slots 37,38. The gaps 57 should be sufficient to permit skewing of the body 30 to provide an angle C of a few degrees.

Once the body 30 has been skewed as desired, the knobs 58 are rotated in a clockwise direction to tighten the threaded shanks 54 of mounting bolts 50,52 and expand the expansion bar 40 in the manner previously described. The stock 62 is now fed between the fingers 36,36' and the rip fence 26, and the force exerted by the fingers increases as the stock progresses downstream to be ripped by the blade 24.

To remove the featherboard 10 from the table 12, the knobs 58 are rotated to loosen the shanks 56 so that the flared ends 60 move downwardly and allow the expansion bar to resume its unexpanded width (see FIG. 3). The featherboard 10 may then be lifted from the table 12, or the body 30 may be displaced along the groove 18 to a new position relative to the rip fence 26.

It should also be noted that the featherboard may be modified, without tools, from right-handed use, shown in the drawings, to left-handed use. This modification is achieved by removing the knobs 58 from the shanks 54, flipping the body 30 180° so that the fingers 36 project in an opposite direction relative to said expansion bar 40, then reattaching said knobs. The featherboard 10 may now be mounted within a groove (not shown) on a side of said saw blade 24 opposite groove 18, and the fingers 36 will be inclined in a downstream direction.

The featherboard 10 preferably is made of polyurethane or other plastics such as nylon. Alternatively, the featherboard could be fabricated of wood, rubber compounds, or metals which are sufficiently resilient to permit flexure of the fingers and expansion and contraction of the expansion bar. The threaded shanks 54 preferably are made of steel.

While the form of apparatus herein described constitutes a preferred embodiment of this invention, it is to be understood that the invention is not limited to this precise form of apparatus, and that changes may be made therein without departing from the scope of the invention.

What is claimed is:

1. For use with a table saw of the type which includes a substantially flat saw table having at least one groove formed in its surface and a blade slot extending through the table adjacent and parallel to said groove, a featherboard comprising:

a body having a plurality of angularly extending elongated fingers and at least a first transverse slot formed therethrough;

mounting bolt means positioned in said first slot and having a threaded shank, a flared lower end, and means threadedly engaging an upper end of said shank; and an expansion bar extending beneath said slot and sized to slidably engage a groove in a saw table and having a first elongate bore formed therethrough receiving said flared end, whereby rotation of said engaging means clamps said body to said bar and draws said flared end upwardly in said bore such that said flared end expands said bar transversely against walls of an associated groove to lock said bar thereagainst.

2. The featherboard of claim 1 further comprising:

a second transverse slot formed in said body, parallel to said first slot;

a second elongate bore formed in said expansion bar; and said mounting bolt means including a second threaded shank extending through said second slot and having a flared lower end received in said second bore and second means threadedly engaging an upper end of said second threaded shank, such that rotation of said second engaging means clamps said body to said bar and draws said flared end of said second shaft upwardly in said second bore thereby expanding said bar transversely against walls of an associated groove to lock said bar thereagainst.

3. The featherboard of claim 2 wherein each of said slots has a width sufficient to form a gap about an associated one of said shanks to permit said body to be skewed relative to said expansion bar.

4. The featherboard of claim 3 wherein each of said bores includes a longitudinally extending slit; and each of said lower ends includes means engaging an associated one of said slits, thereby preventing rotation of said shanks.

5. The featherboard of claim 4 wherein said slots are positioned at opposite ends of said body.

6. The featherboard of claim 5 wherein said ffingers extend from said body intermediate said slots.

7. For use with a table saw of the type which includes a substantially flat saw table having at least one groove formed in its surface and a blade slot extending through the table adjacent and parallel to said groove, a featherboard comprising:

a body having a plurality of angularly extending elongated fingers;

elongated means shaped to fit within a saw table groove; and bolt means for slidably attaching said elongate means to said body and expanding said elongate means transversely against side walls of a saw table groove to lock said elongate means thereagainst such that said body is selectively positionable relative to a saw table groove and releasably attachable by actuation of said attaching means.

8. The featherboard of claim 7 wherein said slidable bolt means comprises:

a pair of transverse slots formed in said body; and a pair of mounting bolts, each positioned within a different one of said slots and attached to said elongate means.

9. The featherboard of claim 8 wherein each of said mounting bolts includes a threaded shank, tightening means threadedly engaging an upper end of said shank, a flared lower end extending below said body and attached to said elongate means such that rotation of said tightening means causes said flared end to be drawn upwardly within said elongate means, thereby expanding said elongate means transversely sufficiently to lock it in a saw table groove.

10. The featherboard of claim 8 wherein said elongate means including an expansion bar sized to slidably engage a saw table groove and defining a pair of bores therethrough shaped and positioned to receive said flared ends.

11. The featherboard of claim 10 wherein said bores each include a slit extending longitudinally of said bar; and said flared lower ends each include a pair of ears extending outwardly therefrom engaging an associated one of said slits, thereby preventing rotation of said shanks as said knob means are rotated.

12. The featherboard of claim 11 wherein said slots each have a width relative to the diameter of said threaded shank sufficient to permit said body to be skewed relative to said expansion bar.

13. In combination with a table saw of the type having a blade slot and at least one groove adjacent said slot and having opposing side walls, a featherboard comprising:

a body having a plurality of angularly extending elongate fingers and a pair of transverse slots;

means positioned within said groove for releasably mounting said body on said table;

means slidably attaching said mounting means to said body including a pair of mounting bolts positioned within said slots and having threaded shanks and flared lower ends attached to said mounting means, and tightening means threaded on upper ends of said shanks, whereby rotation of said tightening means in a first direction causes said flared ends to be drawn into said mounting means toward said body such that said body is clamped to said mounting means and said flared ends expand said mounting means transversely said side walls sufficiently to lock said mounting means within said groove.

14. The featherboard of claim 13 wherein each of said slots has a width relative to the diameter of said shank sufficient to permit said body to be skewed relative to said saw opening.

15. In combination with a table for a table saw of the type having a blade slot and at least one groove adjacent said slot, a featherboard comprising:

a body having a plurality of angularly extending elongate fingers;

means engaging said groove;

means slidably mounting said engaging means to said body and releasably securing said engaging means to said groove, including a pair of transverse slots formed in said body and a pair of mounting bolts, each positioned in a different one of said slots and having a threaded shank, a flared lower end extending below said body and attached to said groove engaging means, knob means threadedly engaging an upper end of said shank such that rotation of said knob means in a first direction causes said body to be clamped to said groove engaging means and said flared end to be drawn into said groove engaging means, thereby expanding said groove engaging means transversely sufficiently to lock it within said groove, and rotation of said knob means in an opposite direction unclamps said body from said groove engaging means and permits contraction of said groove engaging means such that said body is selectively positionable toward or away from said blade slot and said featherboard is selectively displaceable along said groove; and each of said slots has a width relative to a diameter of said shank sufficient to permit said body to be skewed relative to said saw opening.

16. The featherboard of claim 15 wherein said groove engaging means includes an expansion bar extending beneath said body.

17. The featherboard of claim 16 wherein said expansion bar is sufficiently resilient such that said bar contracts to permit removal of said bar from said groove upon reverse rotation of said knob means.

18. The featherboard of claim 17 wherein each of said flared lower ends slopes at an angle of between 30° and 45° with the vertical.

19. For use with a table saw of the type including a substantially flat saw table having at least one groove formed in its surface and a blade slot adjacent and parallel to the groove, a featherboard comprising:

a body having a plurality of angularly extending elongated fingers, a first transverse slot formed therethrough and a second transverse slot formed therethrough and parallel to said first slot;

mounting bolt means including first and second threaded shanks extending through said first and second slots, respectively, and having flared lower ends, and means for threadedly engaging upper ends of said shanks;

an expansion bar extending beneath said slot and sized to slidably engage a groove in a saw table and having first and second bores formed therethrough positioned to receive said first and second flared ends, respectively, whereby rotation of said engaging means clamps said body to said bar and draws said flared ends upwardly in said bore such that said bar expands transversely against side walls of a table groove to lock said bar thereagainst; and each of said slots has a width sufficient to form a gap about an associated one of said shanks to permit said body to be skewed relative to said expansion bar.

20. For use with a table saw of the type which includes a substantially flat saw table having at least one groove formed in its surface and a blade slot extending through the table adjacent and parallel to the groove, a featherboard comprising:

a body having a plurality of angularly extending elongated fingers;

means including an expansion bar sized to slidably engage a saw table groove and having a pair of bores therethrough;

means for slidably mounting said bar to said body including a pair of transverse slots formed in said body and a pair of mounting bolts, each positioned within a different one of said slots and including a flared lower end positioned in different ones of said bores;

each of said bores including a slit extending longitudinally of said bar, and said flared lower ends each include a pair of ears extending outwardly therefrom engaging an associated one of said slits, thereby preventing rotation of said shanks as said knob means are rotated; and said slots each having a width relative to a diameter of an associated one of said shanks sufficient to permit said body to be skewed relative to said expansion bar.

* * * * *